United States Patent
Mathew et al.

(10) Patent No.: US 10,693,833 B2
(45) Date of Patent: Jun. 23, 2020

(54) ADDRESS RESOLUTION SUPPRESSION IN A LOGICAL NETWORK

(71) Applicant: Nicira, Inc., Palo Alto, CA (US)

(72) Inventors: Subin Cyriac Mathew, Palo Alto, CA (US); Ankur Kumar Sharma, Palo Alto, CA (US); Alexander Tessmer, Palo Alto, CA (US); Vivek Agarwal, Palo Alto, CA (US); Ganesan Chandrashekhar, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 299 days.

(21) Appl. No.: 15/451,436

(22) Filed: Mar. 7, 2017

(65) Prior Publication Data

US 2018/0262458 A1    Sep. 13, 2018

(51) Int. Cl.
*H04L 29/12*    (2006.01)
*H04L 12/46*    (2006.01)

(52) U.S. Cl.
CPC ........ *H04L 61/103* (2013.01); *H04L 12/4633* (2013.01); *H04L 12/4641* (2013.01); *H04L 61/6022* (2013.01)

(58) Field of Classification Search
CPC ............... H04L 61/103; H04L 12/4633; H04L 12/4641
USPC ........................................................ 709/245
See application file for complete search history.

(56) References Cited

U.S. PATENT DOCUMENTS

| 9,154,416 | B2* | 10/2015 | Koganti | H04L 49/356 |
| 2013/0254359 | A1* | 9/2013 | Boutros | H04L 61/103 709/223 |
| 2017/0026387 | A1* | 1/2017 | Vissamsetty | H04L 63/1408 |
| 2018/0006969 | A1* | 1/2018 | Venkateshaiah | H04L 49/70 |

* cited by examiner

*Primary Examiner* — Kevin T Bates
*Assistant Examiner* — Nazia Naoreen
(74) *Attorney, Agent, or Firm* — SU IP Consulting (57) ABSTRACT

Example methods are provided for a first host to perform address resolution suppression in a logical network. The first host may support a first virtualized computing instance located on the logical network and a first hypervisor. The method may comprise the first hypervisor broadcasting a notification message within the logical network to trigger one or more control messages, and learning protocol-to-hardware address mapping information associated with multiple second virtualized computing instances located on the logical network based on the one or more control messages. The method may also comprise: in response to the first hypervisor detecting an address resolution request message that includes a protocol address associated with one of the multiple second virtualized computing instances, the first hypervisor generating and sending an address resolution response message to a first virtualized computing instance without broadcasting the address resolution request message on the logical network.

21 Claims, 7 Drawing Sheets

MAC-to-VTEP mapping table 710

| 712 VM MAC | 714 VTEP Label | 716 VTEP IP | 718 VTEP MAC |
|---|---|---|---|
| MAC-3 | VTEP-B | IP-B | MAC-B |
| MAC-5 | VTEP-C | IP-C | MAC-C |
| MAC-6 | VTEP-C | IP-C | MAC-C |

B : First egress packet with tunnel header "B" 730

C : Second egress packet with tunnel header "C" 750

Fig. 7

ADDRESS RESOLUTION SUPPRESSION IN A LOGICAL NETWORK

BACKGROUND

Unless otherwise indicated herein, the approaches described in this section are not admitted to be prior art by inclusion in this section.

In a communications network, address resolution refers to the process of resolving a protocol address (e.g., Internet Protocol (IP) address) to a hardware address (e.g., Media Access Control (MAC) address). For example, address resolution may be required when a source wishes to communicate with a destination. To learn the hardware address of the destination, the source broadcasts a request message that includes a known protocol address of the destination. In response, the destination will send a response message that includes its hardware address. Other recipients are not required to respond to the broadcasted request message. In practice, the broadcast nature of the address resolution process may lead to various problems such as network flooding. Address resolution suppression is therefore desirable to limit the amount of broadcast traffic relating to address resolution.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to address resolution suppression will now be explained in more detail using FIG. 1, which is a schematic diagram illustrating example virtualized computing environment 100 in which address resolution suppression in a logical network may be implemented. It should be understood that, depending on the desired implementation, virtualized computing environment 100 may include additional and/or alternative components than that shown in FIG. 1.

Figure 1:
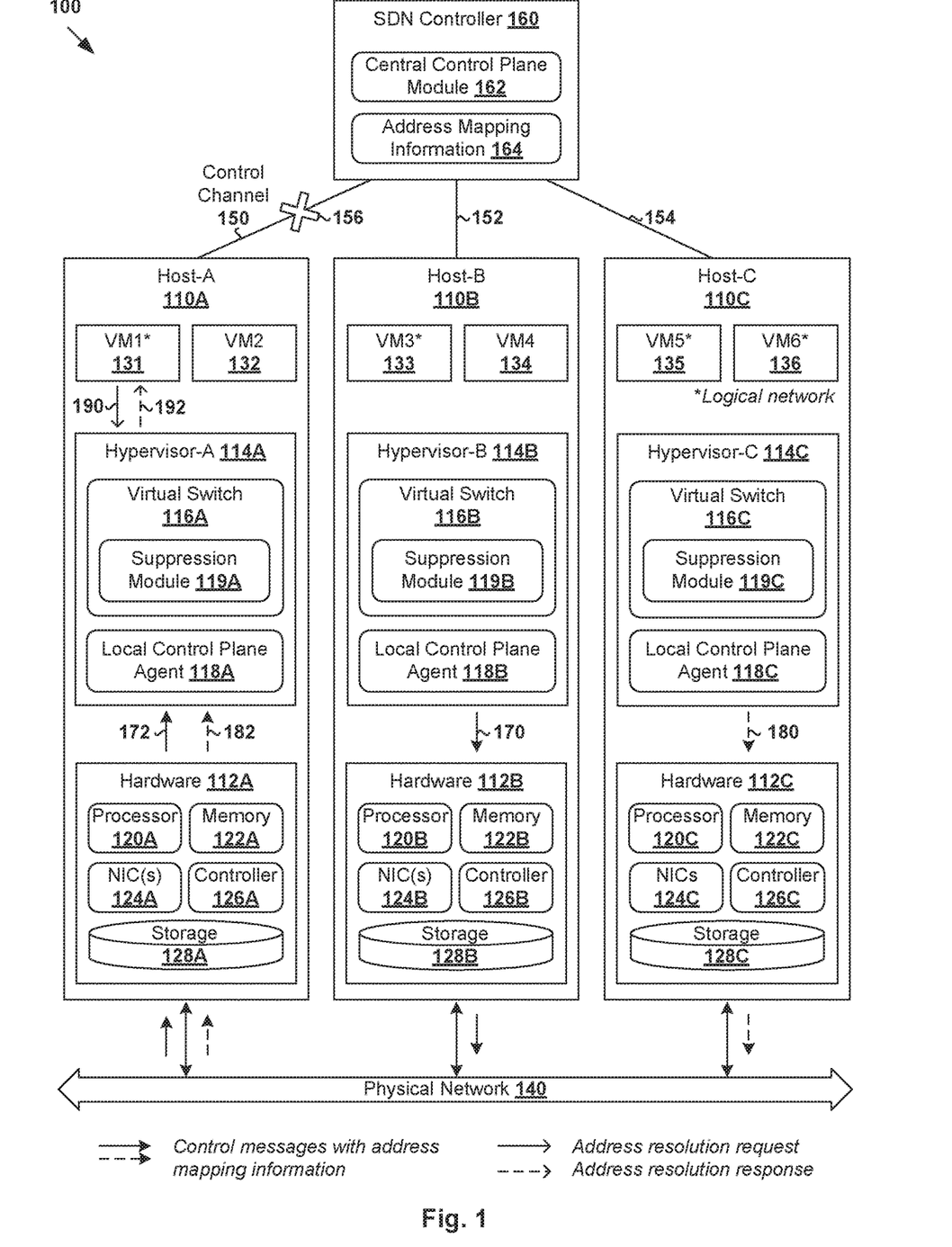
FIG. 1 is a schematic diagram illustrating an example virtualized computing environment in which address resolution suppression in a logical network may be implemented.

In the example in FIG. 1, virtualized computing environment 100 includes multiple hosts, such as host-A 110A, host-B 110B and host-C 110C that are interconnected via physical network 140. Each host 110A/110B/110C includes suitable hardware 112A/112B/112C and virtualization software (e.g., hypervisor-A 114A, hypervisor-B 114B, hypervisor-C 114C) to support various virtual machines. For example, host-A 110A supports VM1 131 and VM2 132; host-B 110B supports VM3 133 and VM4 134; and host-C 110C supports VM5 135 and VM6 136. In practice, virtualized computing environment 100 may include any number of hosts (also known as a "computing devices", "host computers", "host devices", "physical servers", "server systems", etc.), where each host may be supporting tens or hundreds of virtual machines.

Although examples of the present disclosure refer to virtual machines 131-136, it should be understood that a "virtual machine" running on host 110A/110B/110C is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computational environments, containing virtual equivalents of the hardware and software components of a physical computing system. As used herein, the term "hypervisor" may refer generally to a software layer or component that supports the execution of multiple virtualized computing instances, including system-level software that supports namespace containers such as Docker, etc.

Hypervisor 114A/114B/114C maintains a mapping between underlying hardware 112A/112B/112C and virtual resources allocated to respective virtual machines 131-136. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications. For example, corresponding to hardware 112A/112B/112C, the virtual resources may include virtual CPU, virtual memory, virtual disk, virtual network interface controller (VNIC), etc. Hypervisor 114A/114B/114C further implements virtual switch 116A/116B/116C to handle egress packets from, and ingress packets to, respective virtual machines 131-136. The term "packet"

may refer generally to a group of bits that can be transported together from a source to a destination, such as message, segment, datagram, etc.

SDN controller 160 is a "network management entity" that facilitates network virtualization in virtualized computing environment 100. Through network virtualization, logical networks may be provisioned, changed, stored, deleted and restored programmatically without having to reconfigure the underlying physical hardware. SDN controller 160 may be implemented using physical machine(s), virtual machine(s), or both. One example of an SDN controller is the NSX controller component of VMware NSX® (available from VMware, Inc.) that operates on a central control plane. SDN controller 160 may be a member of a controller cluster (not shown) that is configurable using an SDN manager.

Logical networks may be formed using any suitable tunneling protocol, such as Virtual eXtension Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1, VM1 131 on host-A 110A, VM3 133 on host-B 110B, as well as VM5 135 and VM6 136 on host-C 110C, may be configured as members of a first VXLAN logical network (e.g., VXLAN100). A second VXLAN logical network (e.g., VXLAN200) may be configured with VM2 132 on host-A 110A and VM4 134 on host-B 110B as members.

SDN controller 160 is responsible for collecting and disseminating control information relating to logical networks and overlay transport tunnels, such as logical network topology, membership information of logical networks, mobility of the members, firewall rules and policies, etc. To send and receive the control information, local control plane (LCP) agent 118A/118B/118C on host 110A/110B/110C requires control-plane connectivity 150/152/154 with SDN controller 160. As used herein, the term "control-plane connectivity" may refer generally the ability of SDN controller 160 and host 110A/110B/110C to communicate with each other, such as over a management network. To provide the control-plane connectivity, a control-plane channel (or more simply "control channel") may be established between SDN controller 160 and host 110A/110B/110C using any suitable protocol, such as using Transmission Control Protocol (TCP) over Secure Sockets Layer (SSL), etc.

Host 110A/110B/110C also requires data-plane connectivity with other host(s), such as to facilitate communication among members of a logical network, exchange connectivity status information, etc. For example in FIG. 1, host-A 110A requires data-plane connectivity with host-B 110B for VM1 131 to be able to send packets to, and receive packets, from VM3 133 on VXLAN100. Hypervisor 114A/114B/114C implements a virtual tunnel endpoint (VTEP) to encapsulate and decapsulate packets with a tunnel header identifying the logical network. In the example in FIG. 1, hypervisor-A 114A implements a first VTEP, hypervisor-B 114B implements a second VTEP, and hypervisor-C 114C implements a third VTEP. Encapsulated packets (e.g., from VM1 131 to VM3 133) may be sent over a tunnel established between a pair of VTEPs (e.g., hypervisor-A 114A and hypervisor-B 114B).

As used herein, the term "tunnel" may generally refer to an end-to-end, bi-directional communication path between a pair of VTEPs. The term "data-plane connectivity" may refer generally to the ability of two hosts to communicate with each other, such as over physical network 140 (representing a data plane). Physical network 140 may include any suitable number of interconnected network devices, such as layer-3 routers, layer-2 switches, gateway devices, etc. The term "layer 2" may refer generally to a Media Access Control (MAC) layer; and "layer 3" to a network or Internet Protocol (IP) layer in the Open System Interconnection (OSI) model, although the concepts described herein may be used with other networking models.

Address Resolution

In the example in FIG. 1, consider the communication between a pair of virtual machines, such as VM1 131 on host-A 110A and VM3 133 on host-B 110B on VXLAN100. When VM1 131 wishes to communicate with VM3 133, VM1 131 needs to find out the hardware address (e.g., MAC address) of VM3 133. The process of resolving or translating a known protocol address (e.g., IP address) to an unknown hardware address is known as address resolution. In IP-based networks, address resolution may be performed using Address Resolution Protocol (ARP) for IP version 4 (IPv4) addresses or Neighbor Discovery Protocol (NDP) for IP version 6 (IPv6) addresses.

Using ARP as an example, VM1 131 may broadcast an ARP request message within logical network=VXLAN100 to translate IP address=IP-3 of VM3 133 to its corresponding MAC address. Since the ARP request message is broadcasted, VM3 133 on host-B 110B, as well as VM5 135 and VM6 136 on host-C 110C will receive the ARP request message. Each recipient will examine whether its IP address matches with that in the ARP request message. Since its IP address=IP-3, VM3 133 will respond with an ARP response message with MAC address=MAC-3. The ARP response message is a unicast message that is only sent to VM1 131. VM1 131 caches address mapping information (IP-3, MAC-3) in an ARP table entry, which expires if VM1 131 does not communicate with VM3 133 within a predefined period of time. After the ARP table entry expires, VM1 131 will have to repeat the above process to relearn the MAC address of VM3 133. The address resolution process may be repeated by other virtual machines in a similar manner.

Conventionally, one approach to suppress address resolution necessitates the assistance of SDN controller 160 to disseminate address mapping information (see 164 in FIG. 1) to host 110A/110B/110C. However, in practice, host 110A/110B/110C may lose control-plane connectivity 150/152/154 with SDN controller 160. For example, in a multi-site deployment, host-A 110A located at one site might lose control-plane connectivity (see 156 in FIG. 1) with SDN controller 160 located in at different site. The loss of control-plane connectivity may be caused by a failure at SDN controller 160, or a controller cluster that includes SDN controller 160, such as due to power failure, network failure, hardware failure, software failure, etc.

When SDN controller 160 is not available or does not provide any address resolution suppression functionality, it is necessary to broadcast address resolution request messages on a logical network. This has the undesirable effect of increasing the amount of broadcast traffic, which in turn increases the consumption of CPU resource and network bandwidth to forward and process the broadcast traffic. Further, since ARP is a trusting protocol and not designed to cope with malicious entities, the broadcast traffic may be eavesdropped. The lack of authentication mechanism may also lead to ARP poisoning and spoofing. For example, an attacker may create fake ARP response messages to compromise a host's ARP table, thereby increasing the risk of malicious attacks such as host impersonation, denial-of-service (DoS), session hijacking, man-in-the-middle, etc.

Address Resolution Suppression

According to examples of the present disclosure, address resolution suppression may be performed without the assistance of SDN controller 160. Instead, a first hypervisor (e.g., hypervisor-A 114A on host-A 110A) may learn protocol-to-hardware address mapping information from one or more second hypervisors (e.g., hypervisor-B 114B on host-B 110B and hypervisor-C 114C on host-C 110C) to implement address resolution suppression. Examples of the present disclosure may be implemented when SDN controller 160 does not provide any address resolution suppression functionality (known as a primary scheme) or is not available to collect and disseminate address mapping information (known as a secondary scheme).

Throughout the present disclosure, various examples will be explained using host-A 110A as an example "first host," host-B 110B and host-C 110C as example "second hosts," hypervisor-A 114A as an example "first hypervisor," hypervisor-B 114B and hypervisor-C 114C as "second hypervisors," VM1 131 as an example "first virtualized computing instance," VM3 133, VM5 135 and VM6 136 as example "multiple second virtualized computing instances," and SDN controller 160 as an example "network management entity." A logical network may be implemented any suitable tunneling protocol, such as VXLAN, GENEVE, STT, etc. An address resolution request message or response message may be generated using any suitable address resolution protocol, such as ARP, NDP, etc.

Figure 2:
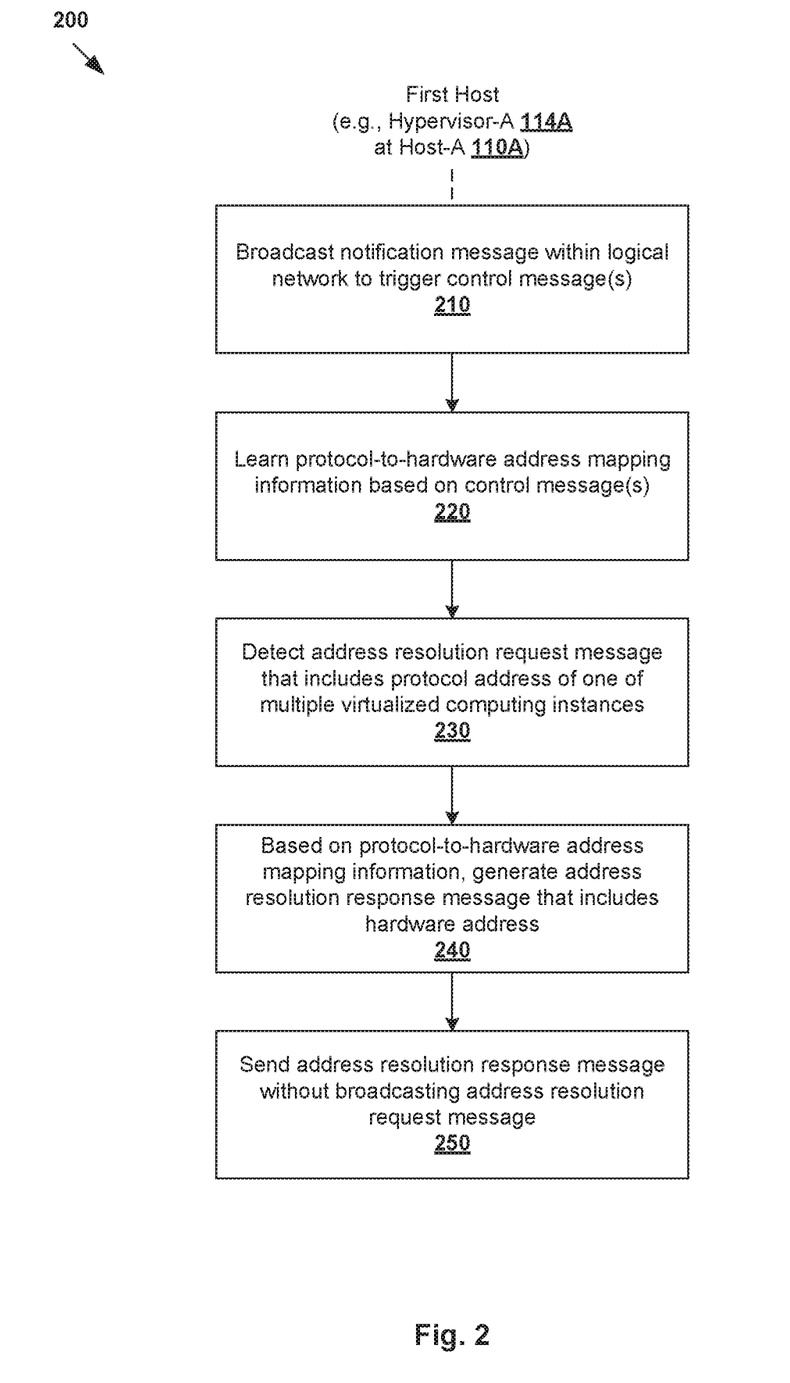
FIG. 2 is a flowchart of an example process for a first host to perform address resolution suppression in a logical network.

In more detail, FIG. 2 is a flowchart of example process 200 for first host 110A to perform address resolution suppression in a logical network. Example process 200 may include one or more operations, functions, or actions illustrated by one or more blocks, such as 210 to 250. The various blocks may be combined into fewer blocks, divided into additional blocks, and/or eliminated depending on the desired implementation. In practice, example process 200 may be implemented by any suitable hypervisor 114A/114B/114C supported by host 110A/110B/110C, such as using address resolution suppression module 119A/119B/119C at virtual switch 116A/116B/116C.

At 210 in FIG. 2, hypervisor-A 114A broadcasts a notification message within a logical network (e.g., VXLAN100) to trigger control messages that originate from respective hypervisor-B 114B supported by host-B 110B and hypervisor-C 114C supported by host-C 110C. As will be described further using FIG. 3, host-A 110A may trigger the control messages by configuring the notification message to include (e.g., in a tunnel header) an indication that host-A 110A is configured to implement address resolution suppression in the logical network without assistance from SDN controller 160.

In practice, the notification message may be sent in several scenarios. In a first example (primary scheme), SDN controller 160 does not provide any address resolution suppression functionality, and host-A 110A relies on host-B 110B and host-C 110C to learn the necessary mapping information. In another example (secondary scheme), SDN controller 160 provides the address suppression functionality, but there is a loss of control-plane connectivity (see 156 in FIG. 1) between host-A 110A and SDN controller 160.

At 220 in FIG. 2, hypervisor-A 114A learns protocol-to-hardware address mapping information associated with VM3 133, VM5 135 and VM6 136 located on the logical network (e.g., VXLAN100). The protocol-to-hardware address mapping information may be learned from the control messages. In the example in FIG. 1, hypervisor-A 114A receives a first control message originating from hypervisor-B 114B at host-B 110B that includes the IP-to-MAC address mapping information of VM3 133 at host-B 110B (see 170 and 172 in FIG. 1). Hypervisor-A 114A also receives a second control message that includes the IP-to-MAC address mapping information of VM5 135 and VM6 136 from hypervisor-C 114C at host-C 110C (see 180 and 182 in FIG. 1).

At 230 in FIG. 2, hypervisor-A 114A detects an address resolution request message (see 190 in FIG. 1) from VM1 131. The address resolution request message may include a protocol address (e.g., IP address=IP-3) associated with VM3 133. Depending on the address resolution protocol, the address resolution request message may be an ARP request message (using ARP for IPv4), neighbor solicitation message (using NDP for IPv6), etc.

At 240 in FIG. 2, based on the protocol-to-hardware address mapping information learned at 220 in FIG. 2, hypervisor-A 114A generates an address resolution response message that includes a hardware address (e.g., MAC address=MAC-3) associated with the protocol address (e.g., IP address=IP-3). Depending on the address resolution protocol, the address resolution response message may be an ARP response message (using ARP for IPv4), neighbor advertisement message (using NDP for IPv6), etc.

At 250 in FIG. 2, hypervisor-A 114A sends the address resolution response message (see 192 in FIG. 1) to VM1 131 without broadcasting the address resolution request message to VM3 133, VM5 135 and VM6 136 located on the logical network. As such, the address resolution request message is suppressed.

As will be described using FIG. 3, host-A 110A may also learn hardware-to-VTEP (e.g., MAC-to-VTEP) address mapping information from the control messages received from respective hypervisor-B 114B and hypervisor-C 114C. For example, the hardware-to-VTEP address mapping information may be used to encapsulate an egress packet from VM1 131 to VM3 133. In this case, the egress packet may be encapsulated with a tunnel header that includes VTEP address information associated with a destination VTEP implemented by hypervisor-B 114B at host-B 110B.

In the following, various examples will be explained using FIG. 3 to FIG. 7. In particular, a detailed example process for address resolution suppression will be explained using FIG. 3, example notification and control messages using FIG. 4 and FIG. 5, example protocol-to-hardware address mapping information using FIG. 6, and example hardware-to-VTEP mapping information using FIG. 7.

Detailed Process

Figure 3:
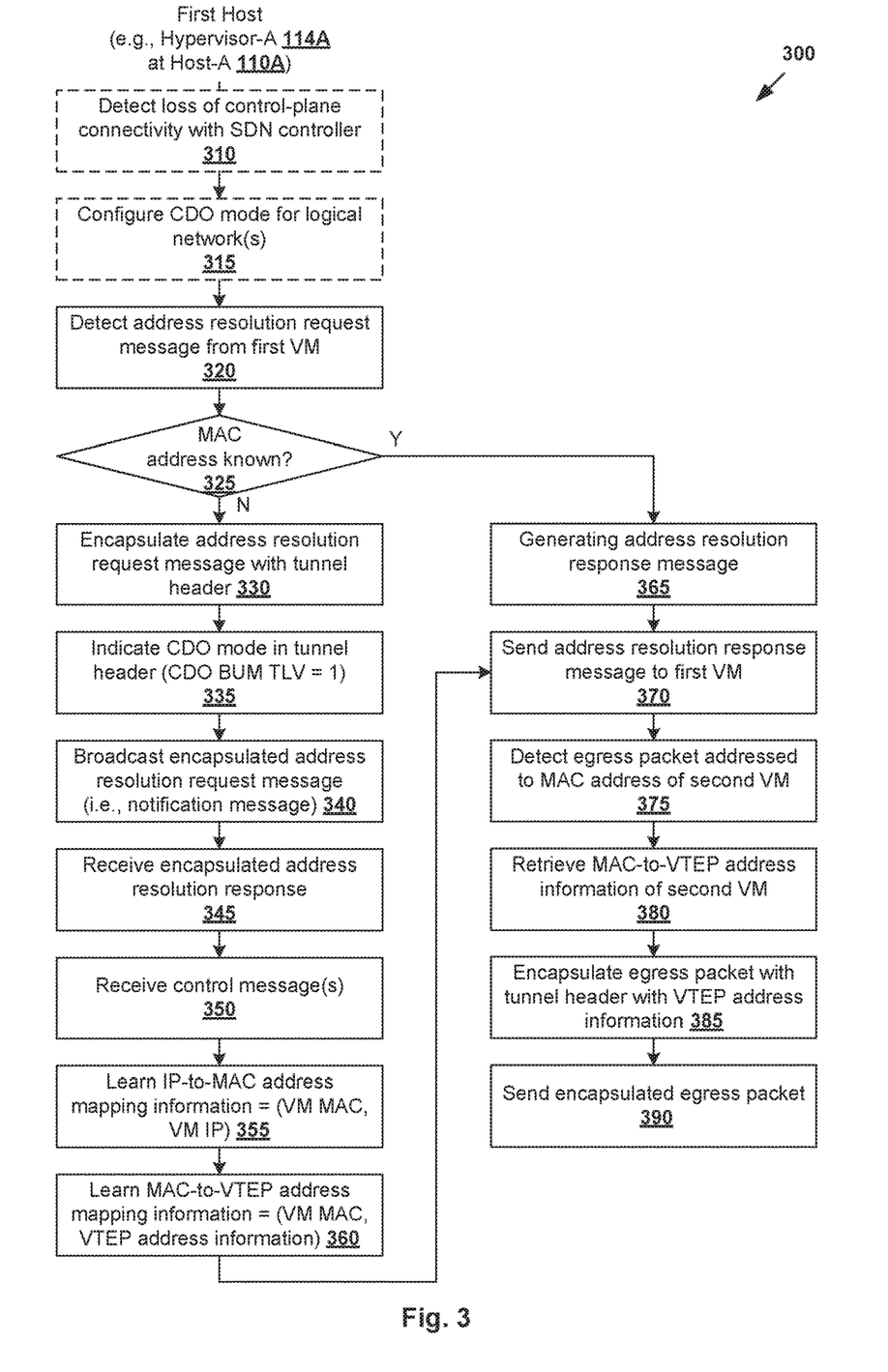
FIG. 3 is a flowchart of an example detailed process for a first host to perform address resolution suppression in a logical network.

FIG. 3 is a flowchart of example detailed process 300 for first host 110A to perform address resolution packet suppression in a logical network. Example process 300 may include one or more operations, functions, or actions illustrated by one or more blocks, such as 310 to 390. The various blocks may be combined into fewer blocks, divided into additional blocks, and/or eliminated depending on the desired implementation.

At 310 and 315 in FIG. 3, in response to detecting a loss of control-plane connectivity with SDN controller 160, hypervisor-A 114A configures a Controller Disconnected Operation (CDO) mode for each logical network of which it is a member. Blocks 310 and 315 (shown in dotted line) may be implemented for the secondary scheme described above, but omitted for the primary scheme (in which case CDO=ON by default). In practice, the connectivity loss may be caused by various factors, such as a disruption to control channel 102, failure (e.g., power, hardware, software, network, etc.) of SDN controller 160, failure of a control cluster to which SDN controller 160 belongs, failure of local control plane agent 118A at host-A 110A (e.g., agent has crashed), etc. When CDO mode=ON, host-A 110A is referred to as a CDO host.

Figure 4:
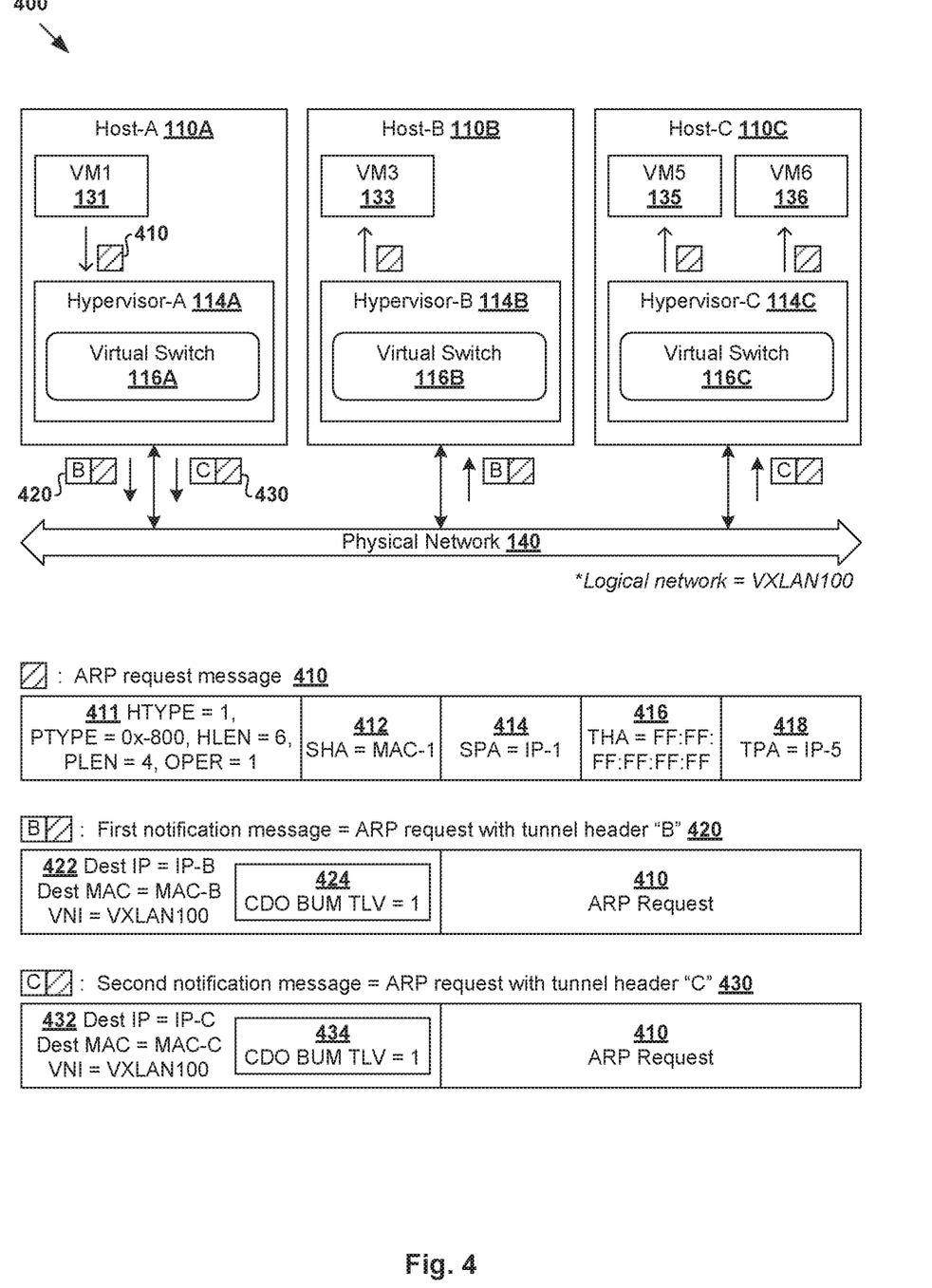
FIG. 4 is a schematic diagram illustrating an example of a first hypervisor supported by a first host triggering control messages from respective second hypervisors supported by respective second hosts.

FIG. 4 is a schematic diagram illustrating example 400 of first hypervisor 114A supported by first host 110A triggering control messages from respective second hypervisors 114B, 114C supported by respective second hosts 110B, 110C. In this example, VM1 131, VM3 133, VM5 135 and VM6 136 are on the same logical network=VXLAN100. In response to detecting the loss of control-plane connectivity, hypervisor-A 114A configures the CDO mode for VXLAN100.

According to examples of the present disclosure, hypervisor-A 114A at host-A 110A may trigger control messages from respective hypervisor-B 114B at host-B 110B and hypervisor-C 114C at host-C 110C using notification messages. Using ARP as an example, encapsulated ARP request messages will be used as example "notification messages" below. Depending on the desired implementation, any other suitable message format may be used for the notification message.

At 320 in FIG. 3, hypervisor-A 114A detects an ARP request message from VM1 131 to resolve an IP address to a MAC address. Referring to the example in FIG. 4, ARP request message 410 includes the following fields (see 411): hardware type (HTYPE) specifies the type of hardware address (e.g., HTYPE=1 for MAC address); protocol type (PTYPE) specifies the type of protocol address (e.g., PTYPE=0x0800 for IP version 4 (IPv4) address); hardware length (HLEN) specifies the hardware address length (e.g., HLEN=6 octets for a MAC address); protocol length (PLEN) specifies the protocol address length (e.g., PLEN=4 octets for an IPv4 address); and operation (OPER) specifies whether the packet is an ARP request (i.e., OPER=1).

ARP request message 410 also includes four addresses. At 412 and 414 in FIG. 4, source hardware address (SHA) specifies the source MAC address=MAC-1 of VM1 131; and source protocol address (SPA) specifies the source IP address=IP-1 of VM1 131. At 416 and 418 in FIG. 4, target hardware address (THA) specifies the target MAC and target protocol address (TPA) specifies the destination IP address=IP-5 of VM5 135. In this case, since the MAC address of VM5 135 is unknown to VM1 131, the THA is set to a broadcast MAC address (e.g., FF:FF:FF:FF:FF:FF).

At 325 in FIG. 3, in response to detecting ARP request message 410, hypervisor-A 114A determines whether the MAC address associated with TPA=IP-5 (see 418 in FIG. 4) is known. For example, this may involve searching for a matching entry in an ARP table maintained by virtual switch 116A. If a match is found, example process 300 continues to block 365, but otherwise, hypervisor-A 114A initiates an address resolution process to retrieve the relevant address mapping information from hypervisor-B 114B and hypervisor-C 114C.

At 330, 335 and 340, hypervisor-A 114A generates a notification message by encapsulating ARP request message 410 with a tunnel header associated with the logical network, and broadcasting the notification (i.e., encapsulated ARP request message) within the logical network.

Using VXLAN as an example, ARP request message 410 may be encapsulated with a VXLAN header; an outer layer-4 header (e.g., User Datagram Protocol (UDP) header); an outer layer-3 header (e.g., IP header) and an outer layer-2 header (e.g., MAC header). The VXLAN header includes a 24-bit VXLAN Network Identifier (VNI) of the logical network (e.g., VNI=VXLAN100). The outer IP header includes a source IP address associated with the source VTEP implemented by hypervisor-A 114A, and a destination IP address associated with the destination VTEP implemented by hypervisor-B 114B or hypervisor-C 114C. The outer MAC header includes a source MAC address associated with the source VTEP, and a destination MAC address associated with the destination VTEP. In the example in FIG. 4, two notification messages are shown (not all fields are illustrated for simplicity).

(a) First notification message 420 is generated by encapsulating ARP request message 410 with tunnel header 422 associated with destination VTEP=hypervisor-B 114B at host-B 110B. Tunnel header 422 identifies destination IP address=IP-B and destination MAC address=MAC-B associated with the destination VTEP, as well as VNI=VXLAN100. An additional bit or Type Length Value (TLV) called "CDO Broadcast/Unknown unicast/Multicast (BUM)" is set as an indication to the destination VTEP that CDO mode=ON at host-A 110A (see 424).

(b) Second notification message 430 is generated by encapsulating ARP request message 410 with tunnel header 432 associated with destination VTEP=hypervisor-C 114C at host-C 110C. Tunnel header 432 identifies IP address=IP-C and MAC address=MAC-C of the destination VTEP. Tunnel header 432 also includes VNI=VXLAN100, and CDO BUM bit=1 (see 434) as an indication to the destination VTEP that CDO mode=ON at host-A 110A.

Hypervisor-A 114A then sends first notification message 420 to hypervisor-B 114B, and second notification message 430 to hypervisor-C 114C over physical network 140. This has the effect of broadcasting the encapsulated ARP request message within the logical network. In practice, any other approach may be used, such as by broadcasting the encapsulated ARP request to a multicast IP address, etc.

In response to receiving notification message 420/430, hypervisor 114B/114C performs decapsulation to obtain ARP request message 410 by removing tunnel header 422/432. Hypervisor 114B/114C also determines whether it supports any member of the logical network identified in tunnel header 422/432. If a particular member is associated with the TPA, ARP request message 410 is forwarded to that member, including VM3 133, VM5 135 and VM6 136.

Control Messages

Figure 5:
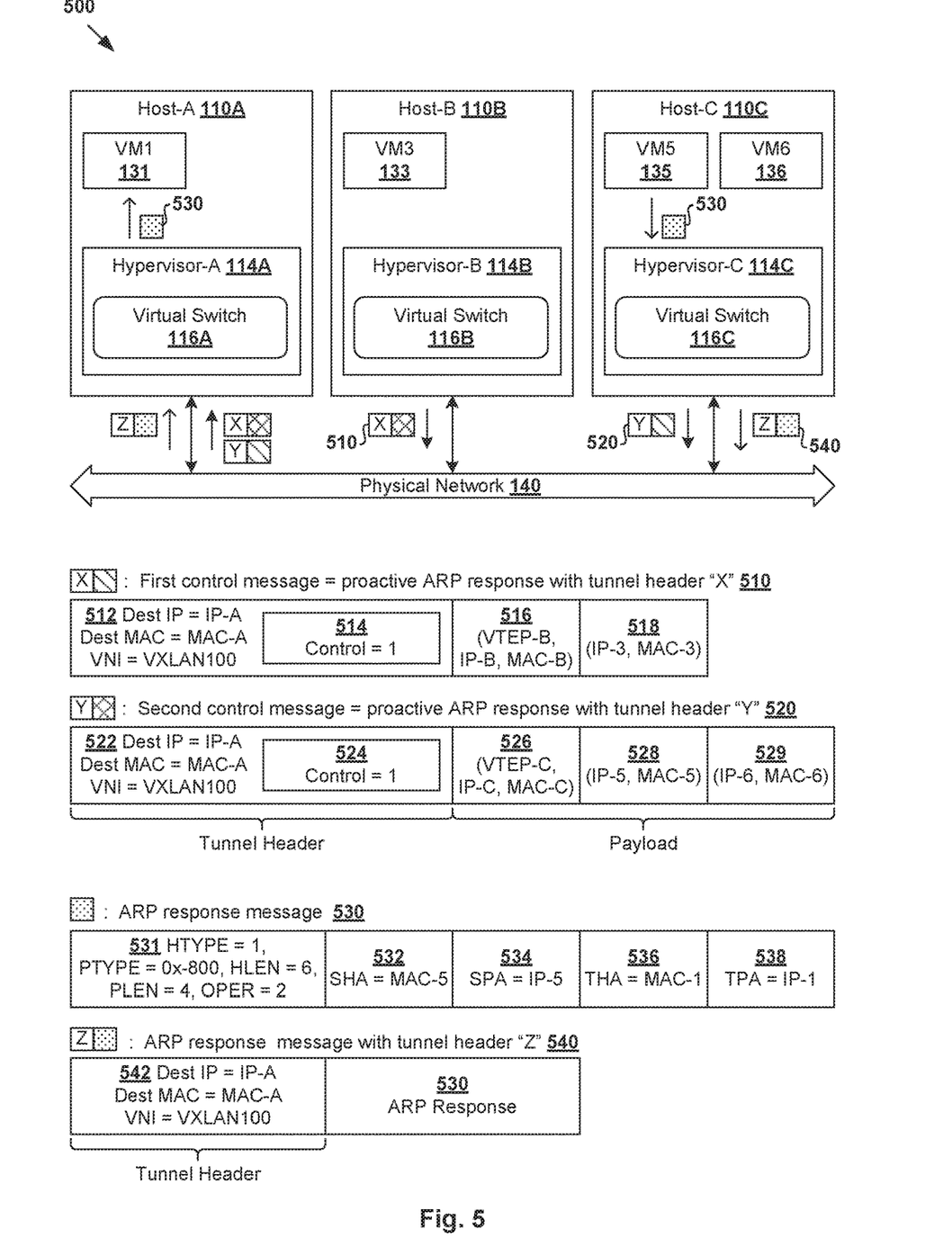
FIG. 5 is a schematic diagram illustrating an example of a first hypervisor supported by a first host receiving control messages from respective second hypervisors supported by respective second hosts.

FIG. 5 is a schematic diagram illustrating example 500 of first hypervisor 114A supported by first host 110A receiving control messages from respective second hypervisors 114B, 114C supported by respective second hosts 110B, 110C. Using ARP as an example, proactive ARP response messages will be used as example "control messages." Here, the term "proactive" may refer generally to hypervisor 114B/114C providing the address mapping information of all members of a logical network in a proactive manner. This should be contrasted with a conventional ARP response message that only reports the address mapping information of one particular member in a reactive manner. Depending on the desired implementation, any other suitable message format may be used.

At host-B 110B, hypervisor-B 114B learns that host-A 110A is a CDO host from first notification message 420. In response, hypervisor-B 114B generates first control message 510, which is a proactive ARP response message encapsulated with tunnel header 512 associated with destination VTEP=hypervisor-A 114A at host-A 110A. Tunnel header 512 identifies IP address=IP-A and MAC address=MAC-A of the destination VTEP, and includes control bit 514 indicating the control message type. At 516 in FIG. 5, the payload sets out information identifying the VTEP supported by hypervisor-B 114B, such as (VTEP label=VTEP-B, IP address=IP-B and MAC address=MAC-B). At 518 in FIG. 5, the payload also sets out address mapping information of each member of logical network=VXLAN100, i.e., (IP-3, MAC-3) associated with VM3 133.

At host-C 110C, hypervisor-C 114C learns that host-A 110A is a CDO host from second notification message 430. In response, hypervisor-B 114B generates second control message 520, which is a proactive ARP response message encapsulated with tunnel header 522 associated with destination VTEP=hypervisor-A 114A at host-A 110A. Tunnel header 522 identifies IP address=IP-A and MAC address=MAC-A of the destination VTEP, and includes control bit 524 indicating the control message type. At 526 in FIG. 5, the payload sets out information identifying the VTEP supported by hypervisor-C 114C, such as (VTEP label=VTEP-C, IP address=IP-C and MAC address=MAC-C). At 528 in FIG. 5, the payload sets out address mapping information of each member of logical network=VXLAN100, i.e., (IP-5, MAC-5) associated with VM5 135 and (IP-6, MAC-6) associated with VM6 136.

In practice, it should be understood that hypervisor 114A/114B/114C may support multiple VTEPs, such as a first VTEP for VXLAN100 and a second VTEP for VXLAN200. In this case, notification message 420/430 in FIG. 4 may identify multiple logical network IDs, such as a first VNI=VXLAN100 (as shown) and a second VNI=VXLAN200. In response, control message 510/520 may be modified include another set of TLVs that specify the (VTEP label, VTEP IP address, VTEP MAC address) of the second VTEP, and address mapping information=(VM IP address, VM MAC address) of each member of VXLAN200.

Further, since the TPA=IP-5 in ARP request message 410, VM5 135 generates and sends ARP response message 530 with the following fields (see 531): HTYPE=1, PTYPE=0x0800, HLEN=6 octets and, PLEN=4 octets, and OPER=2. ARP response message 530 also includes addresses associated with its source=VM5 135 and target=VM1 131. In particular, SHA=MAC-5 (see 532), SPA=IP-5 (see 534), THA=MAC-1 (see 536) and TPA=IP-1 (see 538). To reach VM1 131, hypervisor-C 114C generates encapsulated ARP response message 540 by encapsulating ARP response 530 with tunnel header 542 that includes IP-A and MAC-A associated with destination VTEP=hypervisor-A 114A. Also, tunnel header 542 also identifies logical network=VXLAN100 of which VM5 135 is a member.

Referring to FIG. 3 again, at 345 and 350, hypervisor-A 114A receives first control message 510 from hypervisor-B 114B, and second control message 520 and encapsulated ARP response message 540 from hypervisor-C 114C. Decapsulation is performed to remove tunnel header 542, before ARP response message 530 is forwarded to VM1 131 (see also 370 in FIG. 3). This way, VM1 131 is able to learn the address mapping information=(IP-5, MAC-5) associated with VM5 135 based on the SHA and SPA fields (see 532 and 534) in ARP response message 530.

At 355 in FIG. 3, hypervisor-A 114A updates an ARP table based on first control message 510 from hypervisor-B 114B and second control message 520 from hypervisor-C 114C. The ARP table is updated with the following IP-to-MAC mapping information: (IP-3, MAC-3) associated with VM3 133, (IP-5, MAC-5) associated with VM5 135 and (IP-6, MAC-6) associated with VM6 136.

Further, at 360 in FIG. 3, hypervisor-A 114A updates a MAC table based on first control message 510 from hypervisor-B 114B and second control message 520 from hypervisor-C 114C. The MAC table is updated with the following MAC-to-VTEP mapping information: (MAC-3, VTEP-B, IP-B, MAC-B) associated with hypervisor-B 114B at host-B 110B, as well as (MAC-5, VTEP-C, IP-C, MAC-C) and (MAC-6, VTEP-C, IP-C, MAC-C) associated with hypervisor-C 114C at host-C 110C.

IP-to-MAC Address Mapping Information

The IP-to-MAC address mapping information learned by hypervisor-A 114A may be used to facilitate address resolution suppression for subsequent ARP request messages. In particular, referring to FIG. 3 again, at blocks 320 and 325, in response to receiving an ARP request message, hypervisor-A 114A determines whether the requested MAC address in the ARP request is known. If yes, according to blocks 365 and 370 in FIG. 3, hypervisor-A 114A performs ARP suppression by generating and sending an ARP response message to the sender.

An example will be explained using FIG. 6, which is a schematic diagram illustrating example 600 of first hypervisor 114A performing address resolution suppression based on the protocol-to-hardware address mapping information learned in the example in FIG. 5. ARP table 610 sets out the IP-to-MAC mapping information learned from first control message 510 from hypervisor-B 114B and second control message 520 from hypervisor-C 114C in FIG. 5. Each entry in ARP table 610 includes an IP address (see 612 in FIG. 6) and MAC address (see 614) of a member of logical network=VXLAN100.

Figure 6:
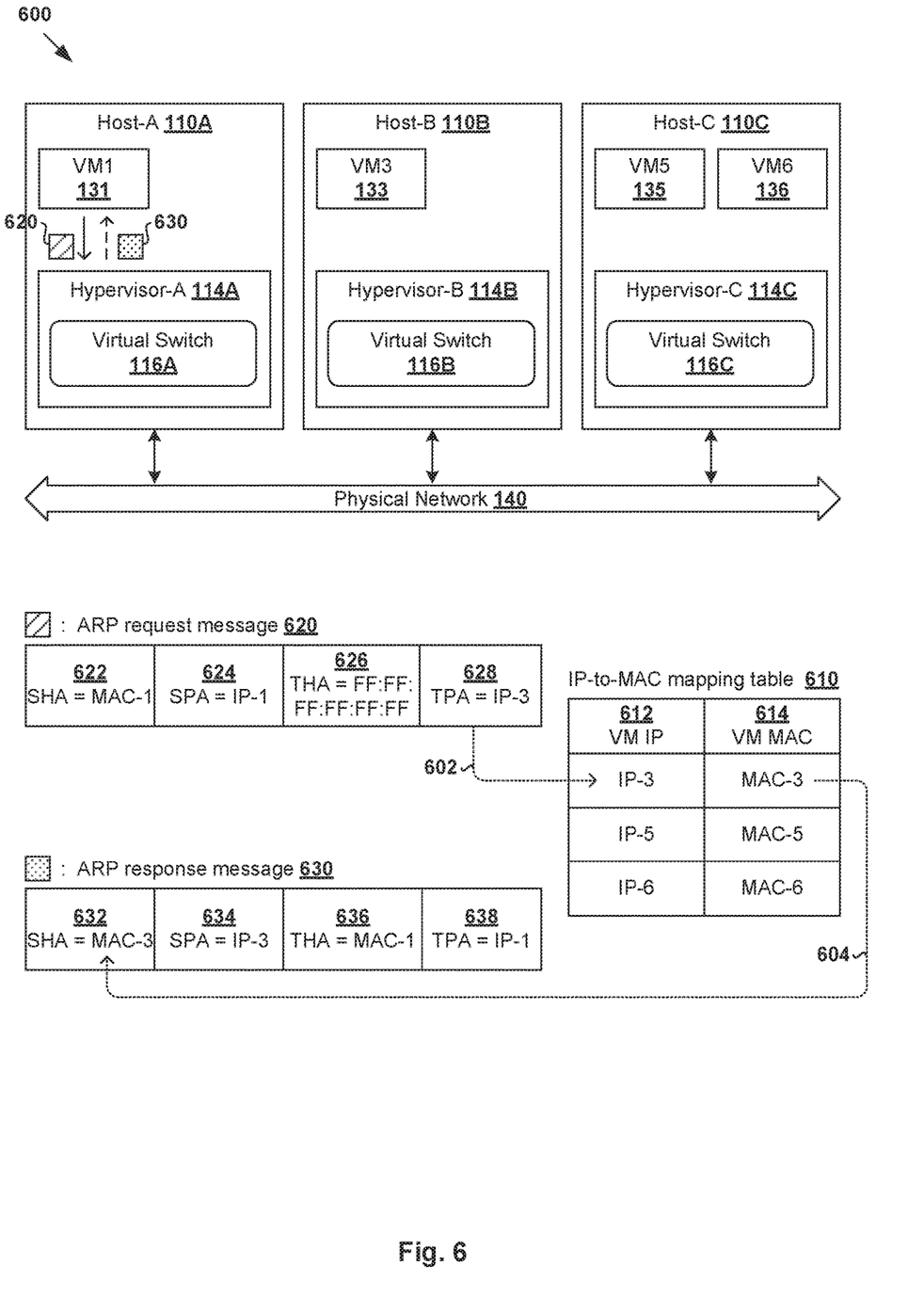
FIG. 6 is a schematic diagram illustrating an example of a first hypervisor performing address resolution suppression based on the protocol-to-hardware address mapping information learned in the example in FIG. 5.

In the example in FIG. 6, assume that VM1 131 wishes to communicate with another member of the logical network, such as VM3 133 on host-B 110B. VM1 131 knows the IP address=IP-3 of VM3 133, but not its MAC address. As such, VM1 131 sends ARP request message 620, which includes SHA=MAC-1 (see 622), SPA=IP-1 (see 624), THA=broadcast address (see 626) and TPA=IP-3 (see 628). For simplicity, other fields such as HTYPE=1, PTYPE=0x0800, HLEN=6 octets and, PLEN=4 octets, and OPER=1 are not shown.

To determine whether the requested MAC address is known, hypervisor-A 114A searches for an entry in ARP table 610 that matches with the field TPA=IP-3 (see 628 in FIG. 6) in ARP request message 620. At 602 in FIG. 6, since a match=(IP-3, MAC-3) is found in ARP table 610, hypervisor-A 114A performs ARP suppression by generating and sending ARP response message 630 to VM1 131.

As indicated at 604 in FIG. 6, hypervisor-A 114A sets SHA=MAC-3 (see 632) in ARP response message 630 based on the matching entry of (IP-3, MAC-3) in ARP table 610. ARP response message 630 also includes SPA=IP-3 (see 634) associated with VM3 133, as well as THA=MAC-1 (see 636) and TPA=IP-1 (see 638) associated with VM1 131 (i.e., source of ARP request message 620). For simplicity, other fields such as HTYPE=1, PTYPE=0x0800, HLEN=6 octets and, PLEN=4 octets, and OPER=2 are not shown. As such, unlike ARP request message 410 in FIG. 4 (i.e., a prior address resolution request message), hypervisor-A 114A is able to suppress subsequent ARP request message 620 in FIG. 6 based on the protocol-to-hardware address mapping information learned from hypervisor-B 114B and hypervisor-C 114C according to the example in FIG. 5.

MAC-to-VTEP Address Mapping Information

The MAC-to-VTEP mapping information learned by hypervisor-A 114A at host-A 110A from host-B 110B and host-C 110C may be used to facilitate subsequent packet forwarding. In particular, referring to FIG. 3 again, at blocks 375 and 380, in response to detecting an egress packet from a source to a destination on a logical network, hypervisor-A 114A retrieves the relevant MAC-to-VTEP information from the MAC table. At 385 and 390 in FIG. 3, hypervisor-A 114A then encapsulates the egress packet with a tunnel header identifying the destination VTEP associated with the destination MAC address, and sends the encapsulated egress packet via physical network 140 to reach the destination.

An example will be explained using FIG. 7, which is a schematic diagram illustrating example 700 of first hypervisor 114A performing packet forwarding based on the hardware-to-virtual tunnel endpoint (VTEP) address mapping information learned in the example in FIG. 5. MAC table 710 sets out the MAC-to-VTEP mapping information learned from first control message 510 from hypervisor-B 114B and second control message 520 from hypervisor-C 114C in FIG. 5. Each entry in MAC table 710 sets out the mapping between a MAC address (see 712 in FIG. 7) of a member of logical network=VXLAN100, and associated VTEP information, including a VTEP label (see 714), VTEP IP address (see 716) and VTEP MAC address (see 718). Two examples are explained below.

Figure 7:
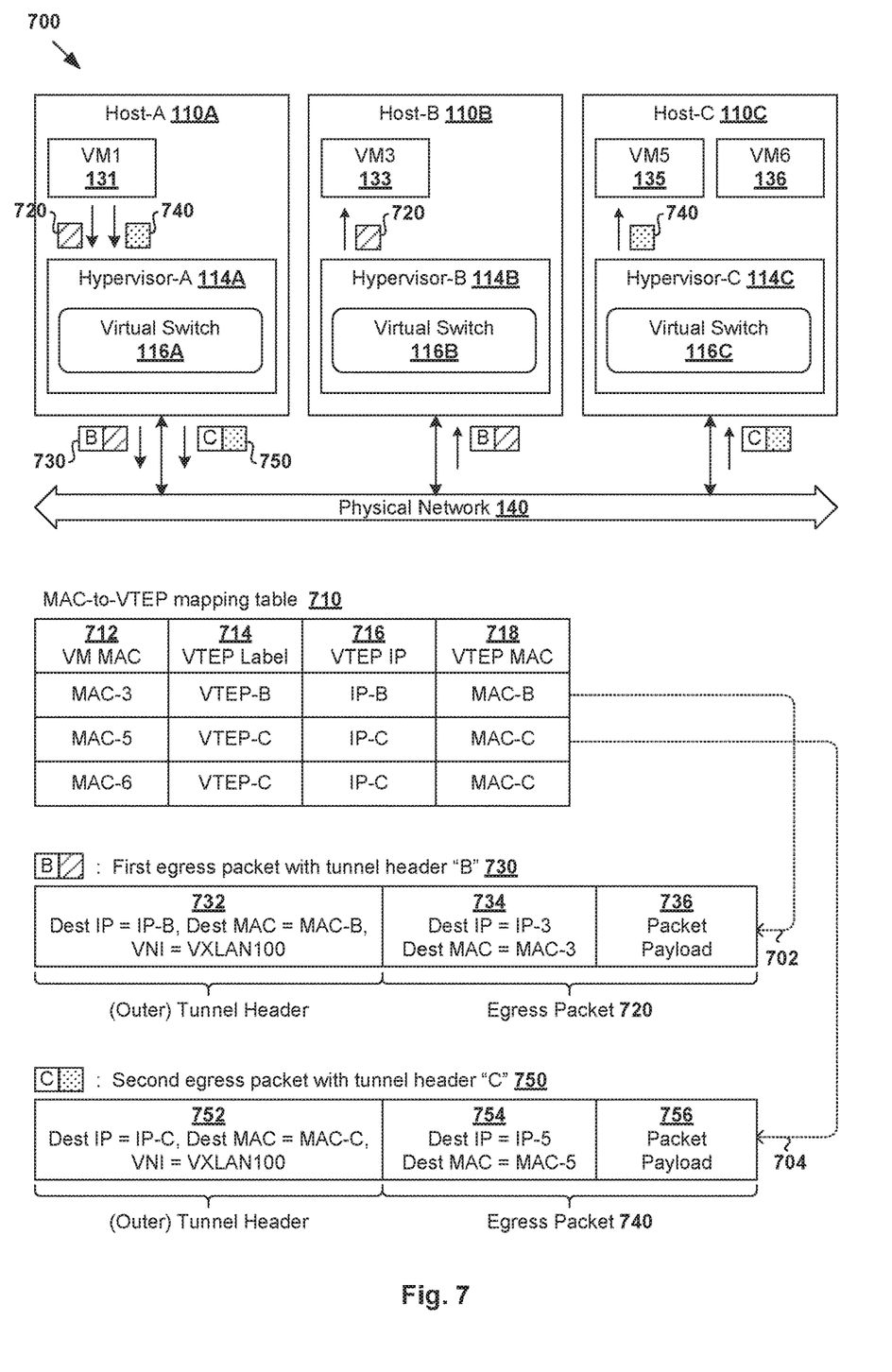
FIG. 7 is a schematic diagram illustrating an example of a first hypervisor performing packet forwarding based on the hardware-to-virtual-tunnel-endpoint (VTEP) address mapping information learned in the example in FIG. 5.

(a) In a first example in FIG. 7, after learning MAC address=MAC-3, VM1 131 sends egress packet 720 to destination=VM3 133. In response to detecting egress packet 720, hypervisor-A 114A generates encapsulated packet 730 by encapsulating egress packet 720 with outer tunnel header 732 (labelled "B"). Egress packet 720 includes packet payload 736 carrying data to be communicated to VM3 133, as well as inner packet header 734 with destination IP address=IP-3 and MAC address=MAC-3 associated with VM3 133.

Based on MAC address=MAC-3 in inner packet header 734, hypervisor-A 114A is able to identify destination VTEP=hypervisor-B 114B from MAC table 710 (see also 702), and configures outer tunnel header 732 with VTEP IP address=IP-B and VTEP MAC address=MAC-B associated with hypervisor-B 114B. Encapsulated packet 730 is then sent from host-A 110A to host-B 110B via physical network 140. At host-B 110B, hypervisor-B 114B performs decapsulation to remove outer tunnel header 732 of encapsulated packet 730. Based on inner packet header 734, VM3 133 is identified as the destination.

(b) In a second example in FIG. 7, after learning MAC address=MAC-5, VM1 131 sends egress packet 740 to destination=VM5 135. In response to detecting egress packet 740, hypervisor-A 114A generates encapsulated packet 750 by encapsulating egress packet 740 with outer tunnel header 752 (labelled "C"). Egress packet 740 includes packet payload 756 carrying data to be communicated to VM5 135, as well as inner packet header 754 with destination IP address=IP-5 and MAC address=MAC-5 associated with VM5 135.

Based on MAC address=MAC-5 in inner packet header 754, hypervisor-A 114A is able to identify that destination VTEP=hypervisor-C 114C from MAC table 710 (see also 704), and configures outer tunnel header 752 with VTEP IP address=IP-C and VTEP MAC address=MAC-C associated with hypervisor-C 114C. Encapsulated packet 750 is then sent from host-A 110A to host-C 110C via physical network 140. At host-C 110C, hypervisor-C 114C performs decapsulation to remove outer tunnel header 752 of encapsulated packet 750 and identifies destination=VM5 135 based on inner packet header 754.

Hypervisor-A 114A may update ARP table 610 in FIG. 6 and MAC table 710 in FIG. 7 as the membership of logical network changes. For example, assuming that VXLAN100 has a new member (e.g., VM7 on host-B 110B), hypervisor-A 114A may repeat blocks 330 to 360 to trigger further control messages from respective hypervisor-B 114B and hypervisor-C 114C when VM1 131 sends an ARP request to resolve a protocol address of VM7 to its hardware address of VM7 similar to the examples in FIG. 3 to FIG. 5. This way, host-A 110A may update ARP table 610 and MAC table 710 with new protocol-to-hardware address mapping information accordingly. Again, this reduces the likelihood of network flooding when subsequent ARP request messages are detected. Hypervisor-B 114B and hypervisor-C 114C may also implement examples of the present disclosure in a similar manner, either according to the primary scheme or secondary scheme discussed above.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7. For example, a computer system capable of acting as SDN controller 160 or host 110A/110B/110C may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first host to perform address resolution suppression in a logical network, wherein the first host supports a first virtualized computing instance located on the logical network and a first hypervisor, and the method comprises:
   in response to a failure of performing address resolution suppression associated with a network management entity:
   broadcasting, by the first hypervisor, a notification message within the logical network to trigger one or more control messages that originate from one or more respective second hypervisors supported by one or more respective second hosts;
   learning, by the first hypervisor based on the one or more control messages, protocol-to-hardware address mapping information associated with multiple second virtualized computing instances located on the logical network;
   in response to the first hypervisor detecting an address resolution request message that includes a protocol address associated with one of the multiple second virtualized computing instances from the first virtualized computing instance;
      generating, by the first hypervisor, an address resolution response message that includes a hardware address associated with the protocol address based on the protocol-to-hardware address mapping information; and
      sending, by the first hypervisor, the address resolution response message to the first virtualized computing instance without broadcasting the address resolution request message on the logical network.

2. The method of claim 1, wherein broadcasting the notification message comprises:
   configuring the notification message to include an indication that the first host is configured to implement address resolution suppression without assistance from the network management entity.

3. The method of claim 2, wherein sending the notification message comprises:
   in response to detecting a prior address resolution request message, generating the notification message by encapsulating the prior address resolution request message with a tunnel header that includes the indication, wherein the prior address resolution request message is received from the first virtualized computing instance or a third virtualized computing instance supported by the first host.

4. The method of claim 2, wherein the method further comprises:
   in response to detecting a loss of control-plane connectivity between the first host from the network management entity, configuring the first host to be a controller-disconnected operation (CDO) host prior to broadcasting the notification message.

5. The method of claim 1, wherein the method further comprises:
   receiving the one or more control messages, wherein a particular control message is generated by a particular second hypervisor to include a tunnel header identifying a first virtual tunnel endpoint (VTEP) implemented by the first hypervisor, and a payload identifying a second VTEP implemented by the particular second hypervisor and protocol-to-hardware address mapping information associated with a particular second virtualized computing instance.

6. The method of claim 1, wherein the method further comprises:
   based on the one or more control messages, learning hardware-to-virtual-tunnel-endpoint (VTEP) address mapping information associated with the multiple second virtualized computing instances.

7. The method of claim 6, wherein the method further comprises:
   detecting, from the first virtualized computing instance, an egress packet addressed to the protocol address and the hardware address in the address resolution response message; and
   based on the hardware-to-VTEP address mapping information, encapsulating the egress packet with a tunnel header that includes VTEP address information associated with the hardware address.

8. A non-transitory computer-readable storage medium that includes a set of instructions which, in response to execution by a processor of a first host, cause the processor to perform a method of address resolution suppression in a logical network, wherein the first host supports a first virtualized computing instance located on the logical network and a first hypervisor, and the method comprises:
   in response to a failure of performing address resolution suppression associated with a network management entity:
   broadcasting, by the first hypervisor, a notification message within the logical network to trigger one or more control messages that originate from one or more respective second hypervisors supported by one or more respective second hosts;
   learning, by the first hypervisor based on the one or more control messages, protocol-to-hardware address mapping information associated with multiple second virtualized computing instances located on the logical network;
   in response to the first hypervisor detecting an address resolution request message that includes a protocol address associated with one of the multiple second virtualized computing instances from the first virtualized computing instance;
      generating, by the first hypervisor, an address resolution response message that includes a hardware address associated with the protocol address based on the protocol-to-hardware address mapping information; and sending, by the first hypervisor, the address resolution response message to the first virtualized computing instance without broadcasting the address resolution request message on the logical network.

9. The non-transitory computer-readable storage medium of claim 8, wherein broadcasting the notification message comprises:
configuring the notification message to include an indication that the first host is configured to implement address resolution suppression without assistance from the network management entity.

10. The non-transitory computer-readable storage medium of claim 9, wherein broadcasting the notification message comprises:
in response to detecting a prior address resolution request message, generating the notification message by encapsulating the prior address resolution request message with a tunnel header that includes the indication, wherein the prior address resolution request message is received from the first virtualized computing instance or a third virtualized computing instance supported by the first host.

11. The non-transitory computer-readable storage medium of claim 9, wherein the method further comprises:
in response to detecting a loss of control-plane connectivity between the first host from the network management entity, configuring the first host to be a controller-disconnected operation (CDO) host prior to broadcasting the notification message.

12. The non-transitory computer-readable storage medium of claim 8, wherein the method further comprises:
receiving the one or more control messages, wherein a particular control message is generated by a particular second hypervisor to include a tunnel header identifying a first virtual tunnel endpoint (VTEP) implemented by the first hypervisor, and a payload identifying a second VTEP implemented by the particular second hypervisor and protocol-to-hardware address mapping information associated with a particular second virtualized computing instance.

13. The non-transitory computer-readable storage medium of claim 8, wherein the method further comprises:
based on the one or more control messages, learning hardware-to-virtual-tunnel-endpoint (VTEP) address mapping information associated with the multiple second virtualized computing instances.

14. The non-transitory computer-readable storage medium of claim 13, wherein the method further comprises:
detecting, from the first virtualized computing instance, an egress packet addressed to the protocol address and the hardware address in the address resolution response message; and
based on the hardware-to-VTEP address mapping information, encapsulating the egress packet with a tunnel header that includes VTEP address information associated with the hardware address.

15. A first host configured to implement address resolution suppression in a logical network, wherein the first host comprises:
a processor; and
a non-transitory computer-readable medium having stored thereon instructions that, when executed by the processor, cause the processor to support a first virtualized computing instance located on the logical network and a first hypervisor, and to perform the following:

in response to a failure of performing address resolution suppression associated with a network management entity:
broadcast, by the first hypervisor, a notification message within the logical network to trigger one or more control messages that originate from one or more respective second hypervisors supported by one or more respective second hosts;
learn, by the first hypervisor based on the one or more control messages, protocol-to-hardware address mapping information associated with multiple second virtualized computing instances located on the logical network;
in response to the first hypervisor detecting an address resolution request message that includes a protocol address associated with one of the multiple second virtualized computing instances from the first virtualized computing instance;
generate, by the first hypervisor, an address resolution response message that includes a hardware address associated with the protocol address based on the protocol-to-hardware address mapping information; and
send, by the first hypervisor, the address resolution response message to the first virtualized computing instance without broadcasting the address resolution request message on the logical network.

16. The first host of claim 15, wherein instructions for broadcasting the notification message cause the processor to:
configure the notification message to include an indication that the first host is configured to implement address resolution suppression without assistance from the network management entity.

17. The first host of claim 16, wherein instructions for broadcasting the notification message cause the processor to:
in response to detecting a prior address resolution request, generate the notification message by encapsulating the prior address resolution request message with a tunnel header that includes the indication, wherein the prior address resolution request message is received from the first virtualized computing instance or a third virtualized computing instance supported by the first host.

18. The first host of claim 16, wherein the instructions further cause the processor to:
in response to detecting a loss of control-plane connectivity between the first host from the network management entity, configure the first host to be a controller-disconnected operation (CDO) host prior to broadcasting the notification message.

19. The first host of claim 15, wherein the instructions further cause the processor to:
receive the one or more control messages, wherein a particular control message is generated by a particular second hypervisor to include a tunnel header identifying a first virtual tunnel endpoint (VTEP) implemented by the first hypervisor, and a payload identifying a second VTEP implemented by the particular second hypervisor and protocol-to-hardware address mapping information associated with a particular second virtualized computing instance.

20. The first host of claim 15, wherein the instructions further cause the processor to:
based on the one or more control messages, learn hardware-to-virtual-tunnel-endpoint (VTEP) address mapping information associated with the multiple second virtualized computing instances.

21. The first host of claim 20, wherein the instructions further cause the processor to:
  detect, from the first virtualized computing instance, an egress packet addressed to the protocol address and the hardware address in the address resolution response message; and
  based on the hardware-to-VTEP address mapping information, encapsulate the egress packet with a tunnel header that includes VTEP address information associated with the hardware address.

\* \* \* \* \*